(12) United States Patent
Circe

(10) Patent No.: US 9,773,255 B2
(45) Date of Patent: Sep. 26, 2017

(54) SYSTEM AND METHOD FOR AUTOMATICALLY DISTRIBUTING TANGIBLE REWARDS FOR ELECTRONIC SOCIAL ACTIVITY

(71) Applicant: Brett Circe, Fort Lauderdale, FL (US)

(72) Inventor: Brett Circe, Fort Lauderdale, FL (US)

( * ) Notice: Subject to any disclaimer, the term of this patent is extended or adjusted under 35 U.S.C. 154(b) by 354 days.

(21) Appl. No.: 13/907,869

(22) Filed: Jun. 1, 2013

(65) Prior Publication Data
US 2014/0156369 A1 Jun. 5, 2014

Related U.S. Application Data

(60) Provisional application No. 61/659,608, filed on Jun. 14, 2012.

(51) Int. Cl.
*G06Q 99/00* (2006.01)
*G06Q 30/00* (2012.01)
*G06Q 30/02* (2012.01)

(52) U.S. Cl.
CPC .............................. *G06Q 30/0217* (2013.01)

(58) Field of Classification Search
CPC . G06Q 50/01; G06Q 30/0232; G06Q 30/0261
USPC ......... 705/14.11, 14.19, 14.31–14.37, 14.57, 705/14.58, 14.64, 319; 370/328
See application file for complete search history.

(56) References Cited

U.S. PATENT DOCUMENTS

| | | | | |
|---|---|---|---|---|
| 5,923,016 A | * | 7/1999 | Fredregill | G06Q 20/342 235/375 |
| 7,716,300 B2 | | 5/2010 | Kott et al. | |
| 7,941,339 B2 | | 5/2011 | Argaiz | |
| 8,626,828 B2 | * | 1/2014 | Lee | G06Q 30/02 705/14.1 |
| 8,935,327 B1 | * | 1/2015 | Agassy | H04L 51/32 709/203 |
| 9,235,848 B1 | * | 1/2016 | Gourley | G06Q 30/0209 |
| 2003/0212595 A1 | * | 11/2003 | Antonucci | G06Q 30/02 705/14.27 |
| 2003/0220834 A1 | * | 11/2003 | Leung | G06Q 30/02 705/14.25 |
| 2006/0190281 A1 | * | 8/2006 | Kott | G06Q 30/02 709/226 |

(Continued)

*Primary Examiner* — Matthew T Sittner
(74) *Attorney, Agent, or Firm* — The Keys Law Firm PLLC

(57) ABSTRACT

A system and method for automatically distributing physical rewards based on a user updating their social status with their mobile device utilizing a system monitor, a validation module, and a redemption module. The system monitor continually monitors social media networks for social updates containing certain preset specified content. When such content is identified, the location and other preset criteria pertaining to the device transmitting the update is validated by the validation module. Once the device has been validated, the redemption module is commanded to issue a tangible reward, such as a movie ticket from a ticket machine or a soda from a soda machine to the user of the device which transmitted the update. This way, the system and method provides a user with a tangible and immediately usable reward in response to the user publishing or sending certain social status updates, messages, or posts with their mobile device.

15 Claims, 9 Drawing Sheets

(56) References Cited

U.S. PATENT DOCUMENTS

| | | | |
|---|---|---|---|
| 2008/0025488 A1* | 1/2008 | Dean | H04M 3/42008 379/201.11 |
| 2008/0103968 A1* | 5/2008 | Bies | G06Q 20/06 705/39 |
| 2008/0233984 A1* | 9/2008 | Franklin | H04L 51/38 455/466 |
| 2009/0170608 A1* | 7/2009 | Herrmann | G06Q 30/02 463/42 |
| 2009/0171760 A1* | 7/2009 | Aarnio | G06Q 30/02 705/14.66 |
| 2009/0182589 A1* | 7/2009 | Kendall | G06Q 10/02 705/5 |
| 2010/0076831 A1* | 3/2010 | Samuel | 705/14.16 |
| 2010/0262282 A1* | 10/2010 | Segal | G06Q 30/02 700/241 |
| 2011/0028160 A1* | 2/2011 | Roeding et al. | 455/456.1 |
| 2011/0141974 A1* | 6/2011 | Lieberman | H04L 51/38 370/328 |
| 2011/0144801 A1* | 6/2011 | Selker | G06Q 30/0251 700/231 |
| 2011/0178861 A1* | 7/2011 | Georgi | G06Q 30/0224 705/14.25 |
| 2011/0184792 A1* | 7/2011 | Butcher | G06Q 10/10 705/14.13 |
| 2011/0218846 A1* | 9/2011 | Fieldman | G06Q 30/0214 705/14.16 |
| 2011/0247036 A1* | 10/2011 | Adimatyam | H04N 5/44543 725/40 |
| 2011/0275311 A1* | 11/2011 | Buehler et al. | 455/3.06 |
| 2011/0307318 A1 | 12/2011 | LaPorte et al. | |
| 2011/0320250 A1* | 12/2011 | Gemmell | G06Q 30/02 705/14.16 |
| 2012/0036085 A1* | 2/2012 | Srivastava | G06Q 10/067 705/348 |
| 2012/0054002 A1* | 3/2012 | Rotbard | G06Q 20/20 705/14.3 |
| 2012/0066041 A1* | 3/2012 | Mankoff | 705/14.17 |
| 2012/0089451 A1* | 4/2012 | Agramonte | G06Q 10/10 705/14.23 |
| 2012/0265703 A1* | 10/2012 | Basra | G06Q 10/10 705/319 |
| 2012/0300087 A1* | 11/2012 | Shore | G06Q 30/02 348/207.1 |
| 2013/0006736 A1* | 1/2013 | Bethke et al. | 705/14.12 |
| 2013/0031080 A1* | 1/2013 | Vijaywargi | G06F 17/30887 707/706 |
| 2013/0054016 A1* | 2/2013 | Canter | G06Q 30/0269 700/237 |
| 2013/0060637 A1* | 3/2013 | Walker et al. | 705/14.58 |
| 2013/0073366 A1* | 3/2013 | Heath | 705/14.25 |
| 2013/0086484 A1* | 4/2013 | Antin et al. | 715/751 |
| 2013/0173377 A1* | 7/2013 | Keller et al. | 705/14.35 |
| 2013/0346170 A1* | 12/2013 | Epstein et al. | 705/14.14 |
| 2014/0058822 A1* | 2/2014 | Sobecks | G06Q 30/02 705/14.37 |
| 2014/0156369 A1* | 6/2014 | Circe | G06Q 30/0217 705/14.19 |

* cited by examiner

SYSTEM AND METHOD FOR AUTOMATICALLY DISTRIBUTING TANGIBLE REWARDS FOR ELECTRONIC SOCIAL ACTIVITY

CROSS REFERENCE TO RELATED APPLICATIONS

This application claims the benefit of co-pending U.S. provisional patent application Ser. No. 61/659,608 filed Jun. 14, 2012.

BACKGROUND OF THE INVENTION

Field of the Invention

This invention relates to a rewards distribution system and, more particularly, to a system and method which facilitates mobile commerce through the distribution of tangible rewards to a user in response to the user performing certain social actions electronically.

Description of the Prior Art

Rewards in the online world for social interactions and updates are becoming very popular. Perks, points, credits, stickers and badges are just a few of the virtual rewards users acquire on a daily basis by interacting with their social networks. U.S. Patent Application No. 2010/0076831, issued to Samuel, teaches the provision of awards to a user's account in response to a user accessing access to one of the plurality of web pages. U.S. Patent Application No. 2011/0028160, issued to Roeding, et al., discloses detecting a presence of a mobile phone within an enclosed space and subsequently transmitting advertising or rewards information to the mobile phone based on its presence. U.S. Patent Application No. 2011/0275311, issued to Buehler, et al., discloses a method of awarding incentives to a user in response to the user participating electronically in ancillary activities relating to a media program currently being broadcast. U.S. Patent Application No. 2012/0066041, issued to Mankoff, discloses methods and systems for offering a real and valuable gift, to be delivered virtually, to users.

Existing systems and methods for providing rewards is to consumers for their activity are limited, however, as they typically work to provide users with rewards to a user account which are virtual or must be subsequently redeemed. Moreover, a user must often generate rewards in such existing systems and methods by availing himself to some merchant related device or software. Furthermore, rewards in such existing systems and methods are not normally physical and/or tangible and designed to be consumable immediately at the location where the user is situated. What is needed therefore, is a system and method which can provide a user with a physical or tangible reward in the real world in response to the user performing certain requested or directed actions in a social media setting with their mobile device.

SUMMARY OF THE INVENTION

A system and method for automatically distributing physical rewards based on a user some electronic communications action, such as updating their social status with their mobile device. The components of Applicant's invention include a system monitor, a validation module, and a redemption module, which work in concert to provide a user with a tangible and immediately usable reward in response to the user publishing or sending certain social status updates, messages, or posts with their mobile device.

As a prerequisite to the operation of a rewards distribution system built in accordance with the present invention, a merchant or other entity seeking to offer tangible or physical rewards through a credit accepting machine (or dispensing machine) must designate one or more credit (or payment) accepting machines to be equipped to automatically (1) apply payment or (2) issue a credit which can be redeemed for products offered by the credit accepting machine. The credit accepting machine must be equipped to do so in exchange for social media activity. In addition, the merchant must designate one or more social action which a user seeking to redeem a reward can perform through social media in order to redeem such a reward. Typically, the offer for a reward is in exchange for a particular social media action, such as the publication of message containing a triggering match phrase(s) or an electronic endorsement by an end user while the end user is on or near the dispensing machine through which the reward will be availed. It is appreciated, however, that a social media action can be tied to the transmission of an electronic message containing a match phrase over any electronic communication network and that the user is not always required to be at the machine to cause a credit to be issued. A user wishing to redeem a reward can then go to the dispensing machine and follow the instructions for redeeming the reward (i.e. send a social media update containing or consisting of the match phrase "brettmovietheatre") and receive the promised reward from the dispensing machine for free or at a discounted cost.

The system monitor continually monitors social media networks for social updates containing whatever match phrases are being utilized at the given moment. It is expected that a plurality of merchants will be using the system at one time and the system monitor can accommodate any number of merchants and match phrases so long as the match phrases in use at any given time are distinct from one another.

When an active match phrase is identified, the location and other preset criteria pertaining to the device transmitting the update containing the match phrase is validated electronically by the validation module. Once the device has been validated, the redemption module, which is attached or otherwise configured to operate the dispensing machine, is electronically commanded to issue a tangible reward to the user of the device which transmitted the update. Thus, the user posting the social update on his mobile device while standing in front of the dispensing machine can receive his promised tangible and instantly usable reward almost immediately after the user published or sent the social status updates, messages, or posts with the match phrase from his mobile device.

It is an object of this invention to provide a system which can provide a user with a physical reward in the real world in response to the user performing certain requested or directed actions in a social media setting with their mobile device.

It is another object of this invention to provide a system and method which can identify preset match phrases in social updates posted in social media outlets, verify the source of the social update and cause a tangible reward to be issued from a dispensing machine in real time.

These and other objects will be apparent to one of skill in the art.

DETAILED DESCRIPTION OF THE INVENTION

Figure 1:
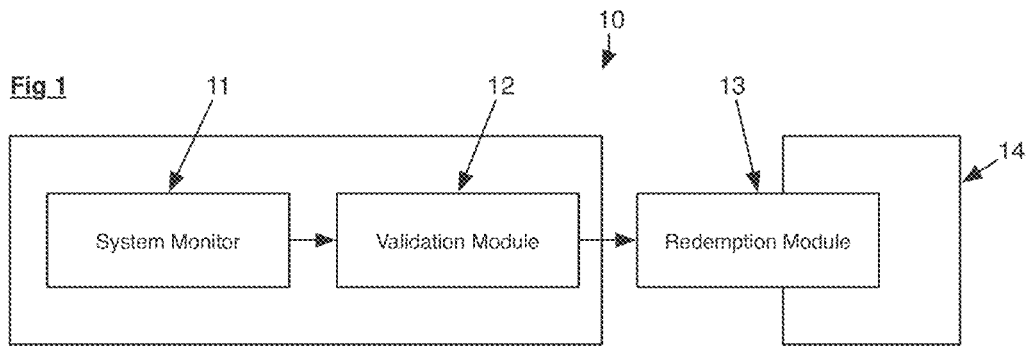
FIG. 1 is block diagram showing the component elements of a rewards distribution system built in accordance with the present invention.

Referring now to the drawings, and in particular FIG. 1, the three primary components utilized by a rewards distribution system 10 and its operational method are shown aligned in their typical operational progression. Specifically, the rewards distribution system 10 includes a system monitor 11, a validation module 12, and a redemption module 13 which each work in concert to allow the distribution of tangible rewards in response to certain preset electronic social interactions. Such tangible rewards are typically dispensed by a conventional electronic dispensing machine 14 on which the redemption module 13 has been configured to run.

Conceptually, the rewards distribution system 10 begins with its system monitor 11 identifying when a user has performed a designated social update via their mobile device. A designated social update is a social update performed by a user which contains a match phrase relevant to an ongoing rewards promotion. The relevant match phrases are typically displayed at the remote location where the user is situated and associated with a particular dispensing machine 14 which dispenses items of value or provides access to admission restricted areas. For example, the dispensing machine 14 could be a vending machine, a video or other game machine, a turnstile, an event ticket dispensing machine, or any like machine. The remote location is typically a merchant that wishes to offer real world rewards to its patrons and visitors in exchange for said patrons promoting in their social media circles something the merchant wants promoted.

The designated social update containing a relevant match phrase can be performed via a mobi web, an app, or SMS message. Typically, the designated social update is designed to promote the merchant where the dispensing machine 14 is located generally, or to promote some product or service from which the merchant may benefit. It is also contemplated, however, that the designated social update can be designed to promote or advertise some product or service with only an indirect association with the merchant.

Once a relevant match phrase has been identified by the rewards distribution system 10, the rewards distribution system 10 must then verify and validate the designated social update and the sending device through its validation module 12. The verification and validation includes identifying the user's location based on location information electronically embedded in the identified designated social update and confirming that the device has not previously redeemed said reward within any applicable period of time (such as within the past 24 hours). Once verified and validated, the rewards distribution system 10, through its redemption module 13, notifies the appropriate dispensing machine 14 and causes it to issue the reward. As a result, said dispensing machine 14 automatically rewards the user with its relevant real-world reward.

Figure 2:
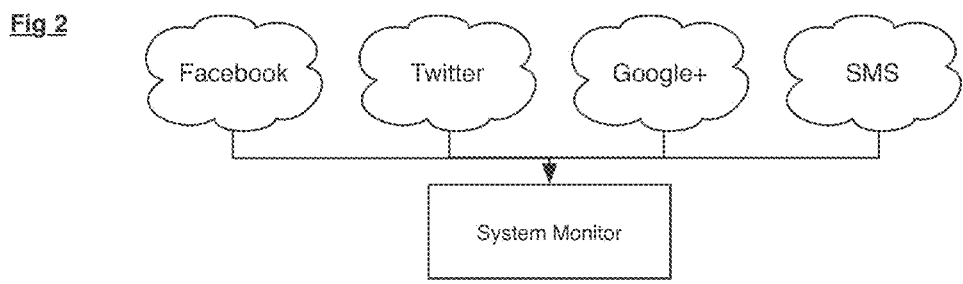
FIG. 2 is block diagram showing a system monitor built in accordance with the present invention.

Referring now to FIG. 2, the system monitor connects to the Internet and through its Internet connection, monitors a plurality of social media outlets. In the preferred embodiment, the system monitor function provides for passive monitoring of electronic communication portals (such as Facebook® pages, Twitter® feeds, Google Plus® accounts, and Common Short Code machines) for social actions such as posts containing a relevant match phrase. In the preferred embodiment, the system monitor function also provides for receipt of redemption notifications from social update portals, which are typically embodied as mobile software applications or interactive webpages, and that are used to simultaneously perform social actions and notify the system monitor. The system monitor function may be embodied in one or more system monitors that can note anytime a social action is detected so that it can pass the relevant information concerning the device which performed the social action to the validation module. It is contemplated that any medium which allows its users to share or publish information or endorse products, services or entities in a social media setting would be suitable for the instant rewards distribution system.

In action, the system monitor is configured to operate based on electronic social actions. As such it will monitor designated Facebook® pages, such as a merchant page who is utilizing a dispensing machine to automatically dispense physical rewards in accordance with the present invention. For example, a movie theatre offering a free movie ticket to any patron who, while at the movie theatre, "Likes" (as an electronic endorsement) the movie theatre's Facebook® page (if the patron had not previously done so) and posts the title of a currently showing movie on the Facebook® page of the movie theatre. Such an action would promote the movie theatre because all of the "Friends" of the patron would see the patron was at that movie theatre to see a movie. To be participating in the rewards distribution system 10 built in accordance with the present invention, the movie theatre would have had to previously register with the rewards distribution system 10, provide access to its Facebook® page to the system monitor, and designate its desired match phrase(s). In the case of the title of a currently showing movie, the movie theatre would for a given week, designate its match phrases as the names of the movies being shown that week.

In a similar fashion, Twitter® feeds and Google Plus® accounts can be monitored for detecting social actions such as match phrases in metadata tags such as hashtags. Instagram® accounts can be monitored for detecting social actions such as specific images. In SMS messages, the system monitor monitors a CSC number, which is displayed along with the match phrase for SMS messages arriving with an acceptable match phrase.

In addition, a social update portal, typically embodied as mobile software application or interactive mobile webpage, can be provided by an administrator to be utilized by users for performing social actions on a social media outlet. A social update portal differs in its interaction with the system monitor in that it is not monitored by the system monitor, but instead sends an electronic notification of a social action to the system monitor whenever the social action is performed through the social update portal. For example, a social update portal configured to access a Facebook® account would notify the system monitor directly upon the performance of a social action, subsequently allowing the redemption of the relevant credit.

Figure 3:
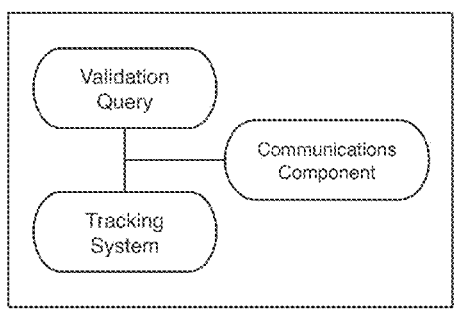
FIG. 3 is block diagram showing a validation module built in accordance with the present invention.

Referring now to FIG. 3, the validation module utilizes a plurality of components to perform a validation routine on the devices whose relevant information is passed to it from the system monitor as having published or sent a message containing the match phrase. In this way, the user or patron transmitting the match phrase and seeking to redeem a reward is identified by the mobile device the patron is using. A validation query component performs the validation routine, which can be customized based on the promotion and the participating merchant's criteria. For example, a movie theatre merchant utilizing the rewards distribution system may allow a patron to redeem a free movie ticket once per thirty days while a restaurant may allow a patron to redeem a free soft drink once every seven days. In the preferred embodiment, the validation routine confirms at least the device's proximity to the dispensing machine and the last occasion on which the device redeemed the reward sought. In an alternate embodiment, the validation routine does not check the device's location. In another embodiment, the validation routine is configured to check the user's social influence and require such social influence to be above or below a certain threshold to qualify for the reward.

If the user validation established for the match phrase passes, the rewards distribution system 10 will issue a Dispense Reward command. A communication component allows this Dispense Reward command to be transmitted to the redemption module, which in the preferred embodiment is connected to or embedded in the dispensing machine, and also, in the case of a user not qualifying for the reward sought, to notify the user in the same medium that the social update was delivered. A user would not qualify for the reward sought if the validation routine was unable to affirmatively verify the requisite criteria.

A tracking system logs the social status update with the user information, location information, date/time information, social influence information, and other desirable information. This information is kept for reporting and analytic purposes.

Figure 4:
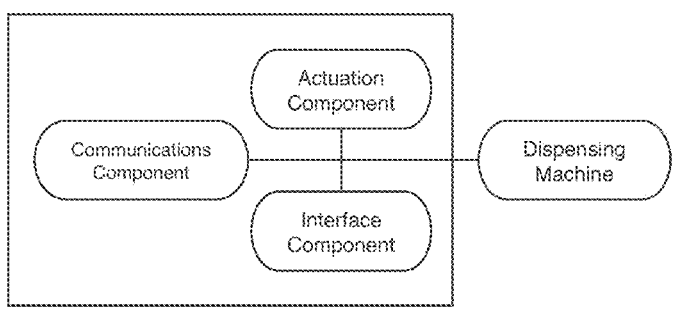
FIG. 4 is block diagram showing a distribution module built in accordance with the present invention.

Referring now to FIG. 4, the communications component of the redemption module receives the Dispense Reward command from the validation module. In the preferred embodiment, the communication component receives transmissions from the validation module via the Internet or cellular service. Once such command is received, the actuation component of the redemption module interprets the command from the validation module and performs additional tasks, such as local validation of pending credits and usage reporting. The interface component is unique to each type of dispensing machine sought to be control. The interface component connects to the machine and causes it to issue the machine credit allowing the user to "redeem" their reward.

Figure 5:
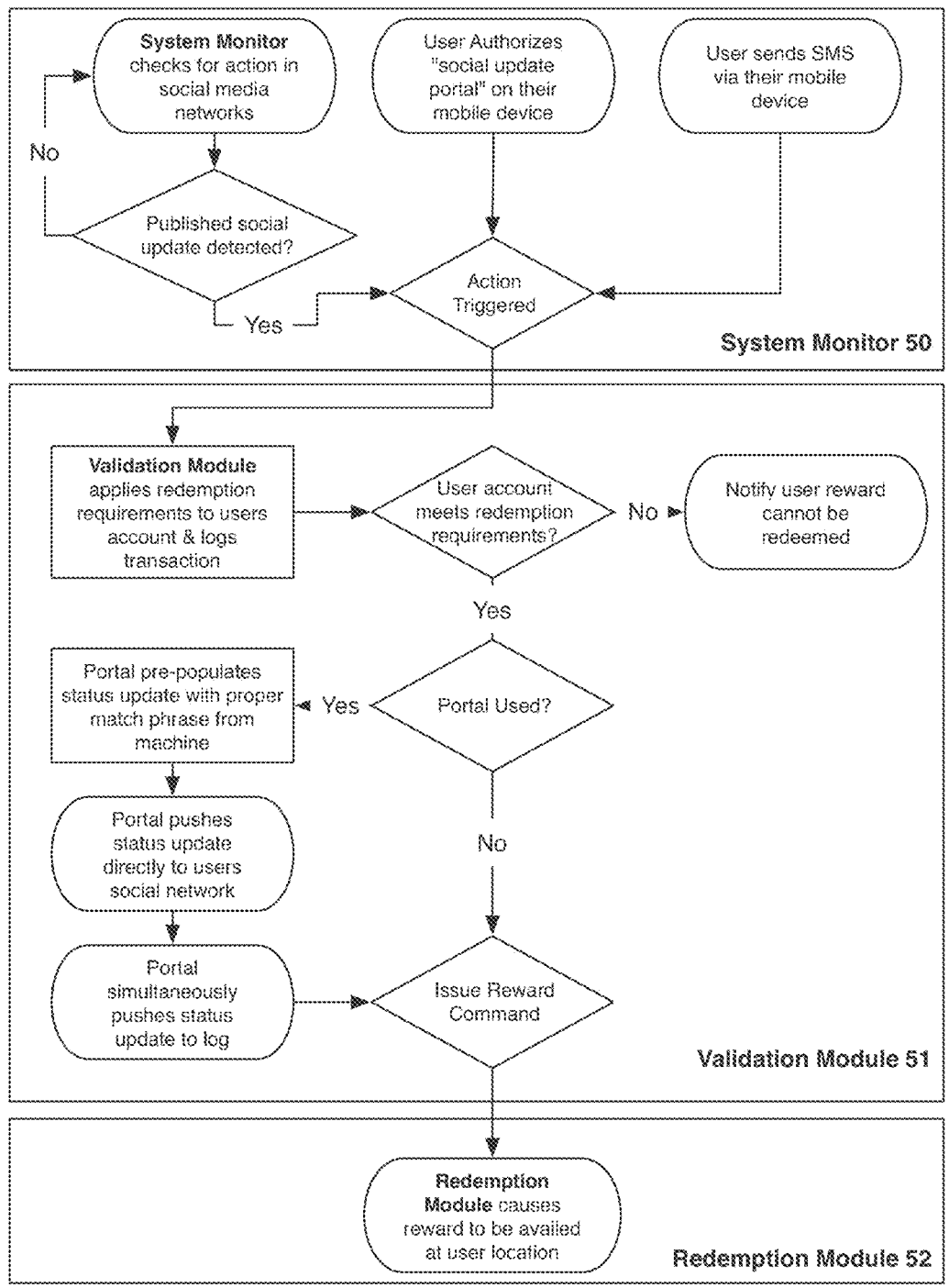
FIG. 5 shows a flow chart of the operational process through which a social action is rewarded for the rewards distribution system built in accordance with the present invention.
Figure 6:
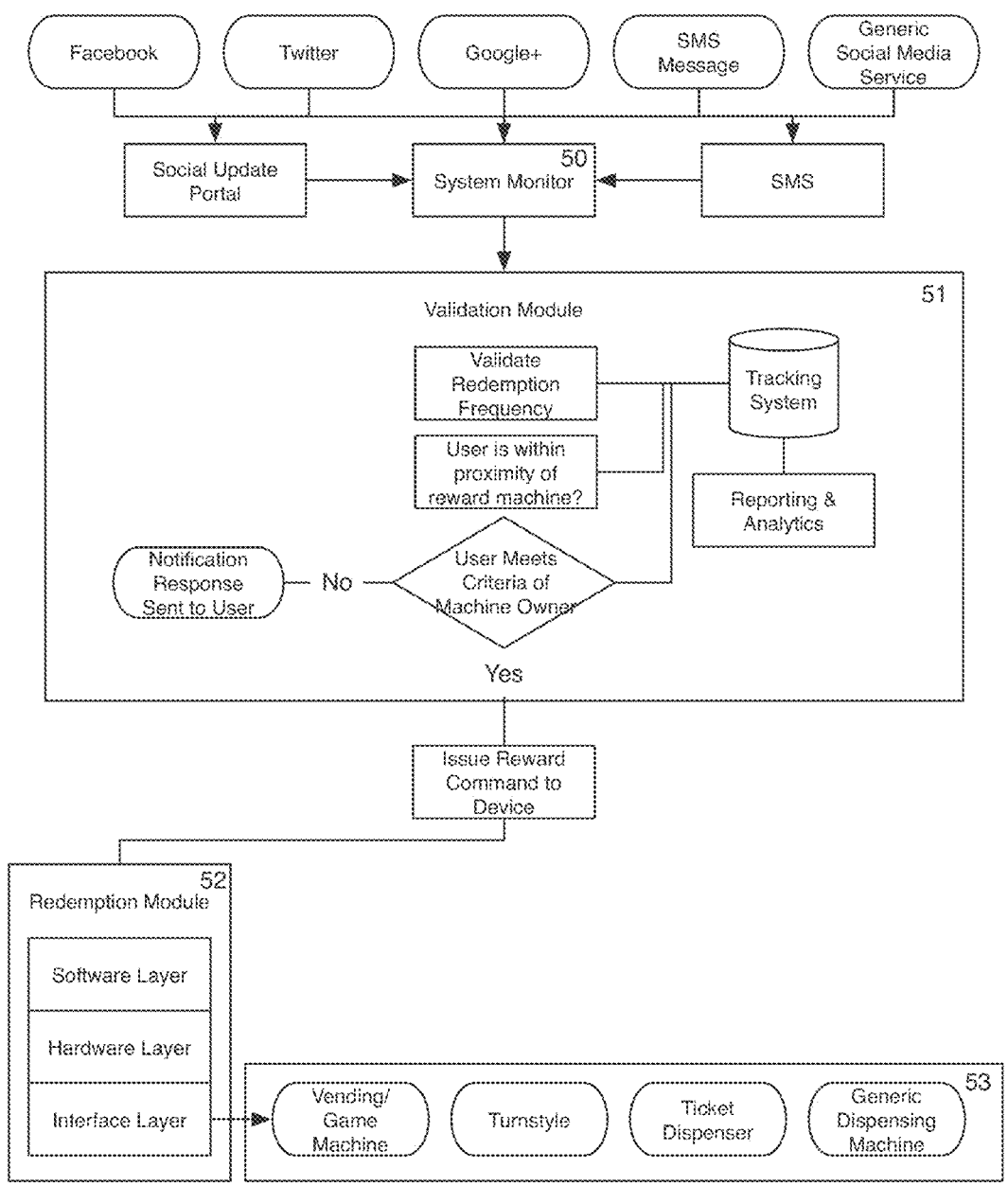
FIG. 6 is a block diagram showing the operational components of the rewards distribution system built in accordance with the present invention.

Referring now to FIGS. 5 and 6, while the rewards distribution system is operational, the system monitor 50 is configured to continually monitor the relevant social media networks for socials actions such as posts or messages which contain a match phrase and otherwise stay apprised of such social actions through social update portals. It is contemplated that such social actions are typically performed through services such as Facebook®, Twitter®, Google+, and standard direct message delivery services. It is therefore understood that the one or more social update portals may be present on user devices through which social media services can be accessed and social actions can be performed and rewarded. The process of providing tangible rewards to an end user in exchange for a particular social action typically starts with an end user seeing a sign associated with a dispensing machine 53 indicating that the dispensing machine 53 will give the user a credit for a tangible or physical reward if they perform a particular social action via their mobile device. The social action may include an update to their social status with a particular match phrase or a status update containing specific language. Typically, such a sign must be located at the machine in advance by the merchant seeking to participate (or other entity participating) in the rewards distribution system that provides tangible rewards for social media activity. It is appreciated that such a sign may be embodied as an electronic sign which allows for match phrase or reward not only be displayed, but also customized in real time. The required social actions being actively used at any given time by the rewards distribution system are kept on file by the system monitor 50 in a rewards database so that the monitor can scan social media networks and/or receive notifications from social update portals and successfully identify qualifying updates with precision. It is contemplated that when a custom match phrases on an electronic sign is used, the system monitor 50 is updated simultaneously with the sign to maintain the integrity of the reward distribution system.

When a user sees sign promoting a reward built in accordance with the present invention and decides to seek the offered reward, the user must utilize their mobile device to follow instructions on the sign to perform a social action that will qualify them for the reward. In the preferred embodiment, the social action would be performed through an SMS message sent to a designated number, the publishing of a social update containing a match phrase, or the authorization of a social update through a social update portal.

It is contemplated that the majority of mobile devices in operation allow for course and/or fine location pinpointing while in use for the applicable social network being used. As such, in the preferred embodiment, some rewards may require the user to enable such location pinpointing on their mobile device and permit it to be shared with and subsequently by the social media outlet or social update portal being used. In such a circumstance, if the user posts a tweet to a Twitter® account in while seeking to redeem an award offered in accordance with the present invention, the user's mobile device must have some form of location tracking enabled and also must allow whatever app being used to access the Twitter® account to share this location information with the tweet. In this embodiment, it is understood that the social update portal would also provide location information in its notifications to the system monitor 50.

As the system monitor 50 is continually monitoring social media networks for social actions that qualify for a reward distribution (such as a social update that includes match phrases that are an exact match to a match phrase in its rewards database) and is configured to receive notifications from social update portals of qualifying social actions, it is able to detect substantially in real time when a qualifying social action is performed. For example, a published social update containing a designated match phrase will be recognized almost immediately once it is posted or sent. Similarly, as any social update portal being utilized is configured to notify the system monitor 50 of qualifying social actions, the system monitor 50 will be apprised of any such action. Once the system monitor 50 detects a social action, the validation module 51 applies a validation routine to the mobile device (typically tracked as a user account by rewards distribution system 10) of the end user. The validation routine primarily determines whether the user account is eligible for a reward distribution by applying any preset redemption criteria to the user account. The preset redemption criteria may include a checking the user account's previous validation redemptions and confirming the previous redemptions do not exceed a preset redemption frequency limit (such as a one redemption per day limit), checking the location of the user account (based on the location of the host mobile device) and confirming the user account is within a preset proximity of a dispensing machine, and any other criteria which may be provided by the user and required by the merchant operating the dispensing machine. Such information may include the age of the user, available demographic information, and social influence information. All information that is acquired and processed by the validation module 51 during this redemption routine is tracked by a unique identifier (such as a telephone number for a mobile device or user account identification) and stored in a database for future reporting and analytics use.

In an alternate embodiment, if the location information from the social network is not available or not required by the merchant operating the dispensing machine, the validation routine may be configured to omit or waive this requirement. In either embodiment, the validation module 51 can add additional information about the mobile device (or user's social account) which may have been previously stored by its tracking system and utilize it if the merchant operating the dispensing machine's redemption criteria requires such information as part of the validation routine.

The validation module 51 runs the user validation routine primarily based on the acquired information concerning the user account and mobile device. If the mobile device does not meet the base criteria, which in the preferred embodiment may include a specified proximity to dispensing machine 53 for certain rewards and a preset time duration since the last redemption by the mobile device, a notification is sent to the mobile device that a reward cannot be redeemed. As previously mentioned, additional criteria can be coded into the validation routine at the request of the merchant operating the particular dispensing machine.

If the mobile device meets the criteria for the dispensing machine 53 sought to be used, the validation routine completes successfully and the validation module 51 proceeds to the next step. In many cases, this next step is the transmission of an issue reward command to the redemption module 52. This issue reward command causes the particular dispensing machine 53 to be availed to the user of the mobile device which was just validated by the validation module 51. The redemption module 52 is typically embodied as an interface component located at the site of the dispensing machine 53 so as to allow for the interpretation of commands from the validation module, perform local preset validation steps, and data tracking to enable usage reporting. In addition to the electronic interface with the dispensing machine 53, the redemption module 52 requires network access sufficient to communicate electronically with the validation module (typically an Internet connection) and a form of electrical power.

But as there are different manners in which a social action can be performed, the rewards distribution system 10 is configured to recognize and reward social actions in a plurality of ways. For social actions performed through the publication of a match phrase (typically contained in a published electronic message, the rewards distribution system 10 simply picks up the match phrase through its ongoing scanning of social media outlets by such publication and directs the publishing user account directly to the validation module. For social actions performed through a direct message delivery service (such as SMS or MMS), upon receipt of the message the rewards distribution system 10 is configured log the user account identifying information with the system monitor 50 and then send this information to the validation module 51. For social actions performed through a social update portal, the social update portal is typically first run on the user's mobile device, associated with a particular user account, and authorized to operate on the mobile device. When a user seeks to redeem a reward, the social update portal first communicates electronically with the validation module 51 through the system monitor 50 to check for applicable redemption requirements for the subject requested social action (typically ascertainable while at the dispensing machine), such as those relating to the social media outlet account, existence or frequency of prior redemptions, and possibly location information. If the user's device meets the redemption requirements, instead of the validation module 51 issuing an issue reward command directly, social update portal first loads and populates a status update which will qualify the user for a reward at a particular dispensing machine. This pre-populated status update is then published directly on the user's social media account (such as a Facebook® timeline) and simultaneously confirmed by the validation module 51 through the system monitor 50. Once confirmed, the issue reward command is given as discussed above.

From the patron or user's perspective, the operation of the rewards distribution system 10 built in accordance with the present invention is very straightforward. For example, a user going to a movie may see a sign offering a free ticket in exchange for a social status update which indicates the movie theatre's name and the movie the user is going to watch. In response, the user makes social update via their mobile device which promotes the theatre while standing at a ticket dispensing machine configured to work with the instant rewards distribution system. Shortly thereafter, the ticket dispensing machine at the theatre prints out a ticket for the user. The user has received a tangible, location specific reward in exchange for his social update and the movie theatre has just received a "word of mouth" like promotion.

Likewise, a user at the mall may see a "claw" machine in the food court which offers a free play in exchange for a social network update promoting the mall. In response to the offer, the user makes a social network update via their mobile device to promote the mall. The "claw" machine then provides one play "credit" allowing the user to play and grab a toy. Similarly, a user in an airport may see a soda machine offering a free soda in exchange for sending a certain text message to a CSC number. The user sends a text message to a CSC number via their mobile device, which inherently provides their contact information. The soda machine then provides a credit with which the user can select a soda as a reward and airport receives the contact information from a known patron with which to build a mailing list for future marketing.

Figure 7:
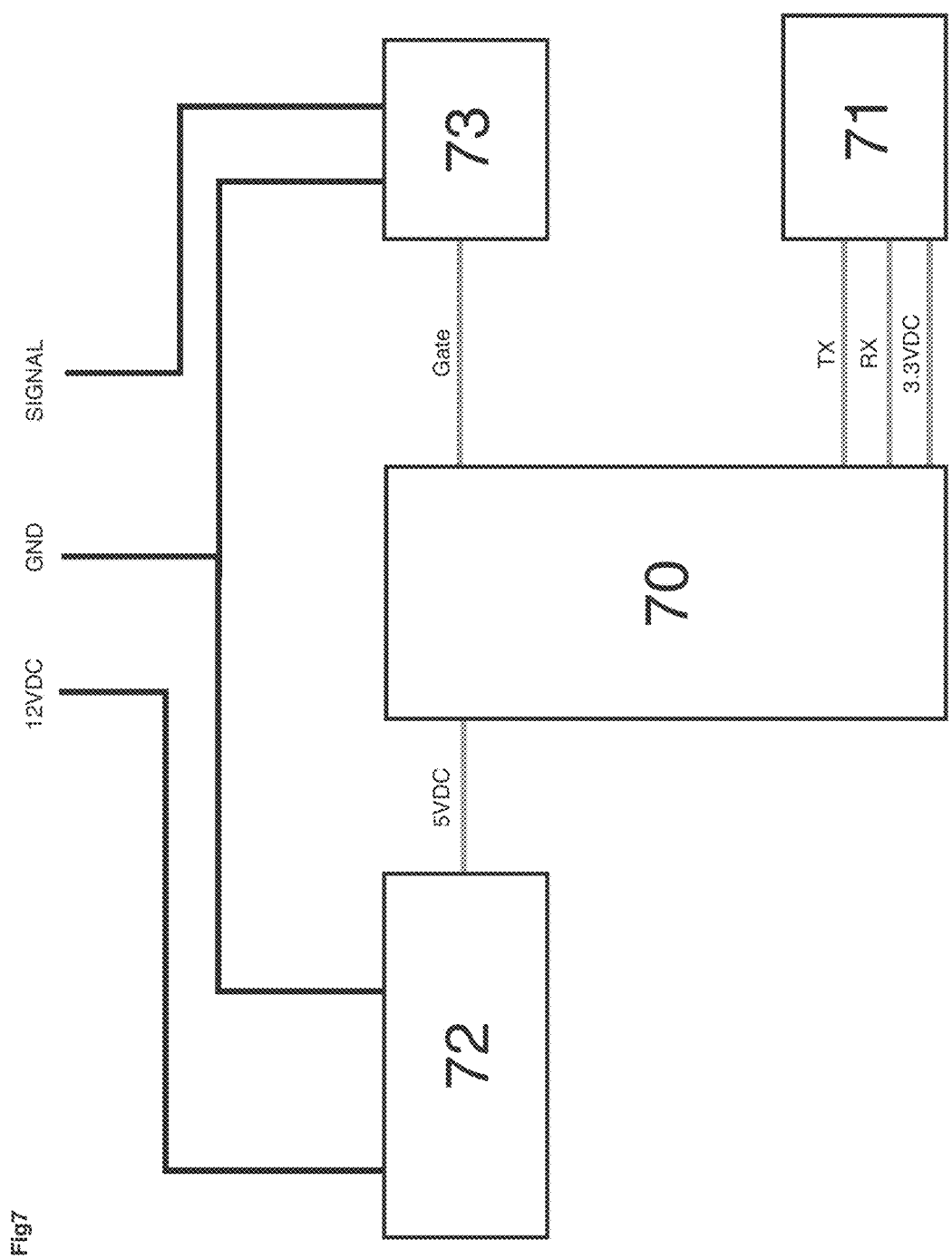
FIG. 7 shows the primary hardware components of the non-video version of a system built in accordance with the present invention.
Figure 8:
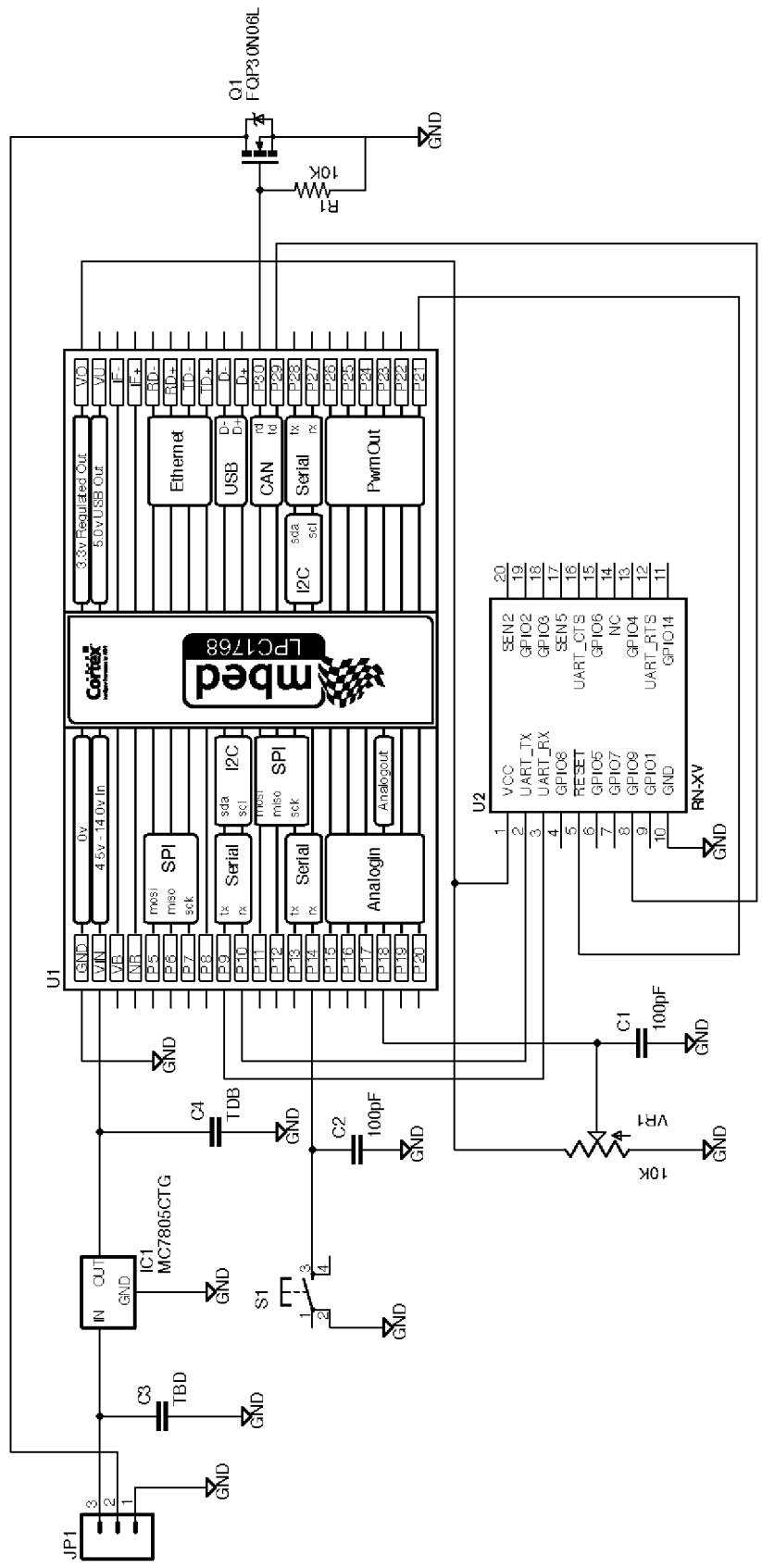
FIG. 8 shows the circuitry components of the non-video version of a system built in accordance with the present invention.

There are two versions of the interface of the redemption module 52 of a rewards distribution system built in accordance with the preferred embodiment of the present invention, a non-video version and a video version. Referring now to FIGS. 7 and 8, the hardware setup of the preferred embodiment of the non-video version includes uses a microcontroller 70 which connects to a Wi-Fi 71 module through a universal asynchronous receiver/transmitter, as well as to a linear regulator 72 and a negative-channel metal-oxide semiconductor ("NMOS") 73.

Figure 9:
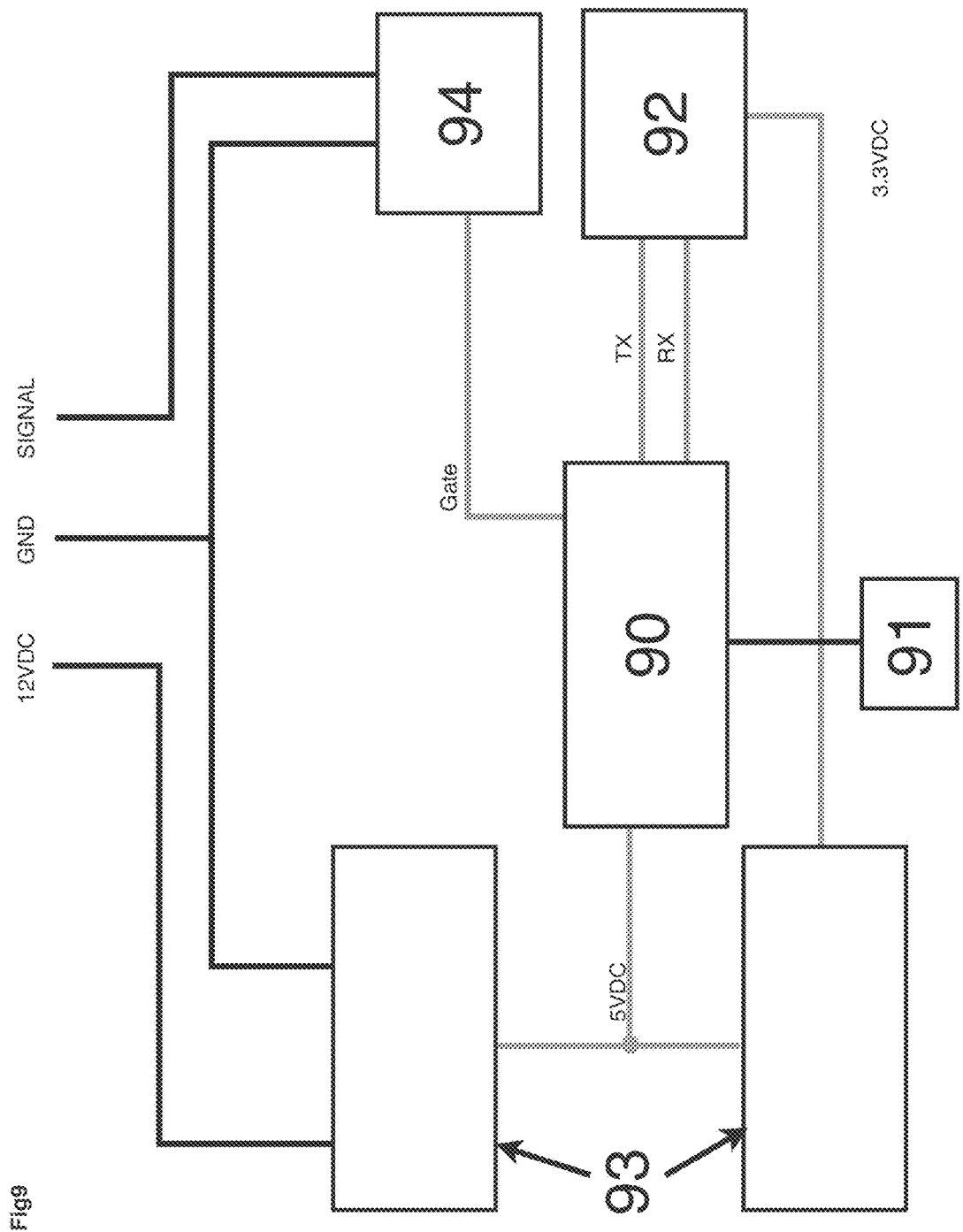
FIG. 9 shows the primary hardware components of the video version of a system built in accordance with the present invention.
Figure 10:
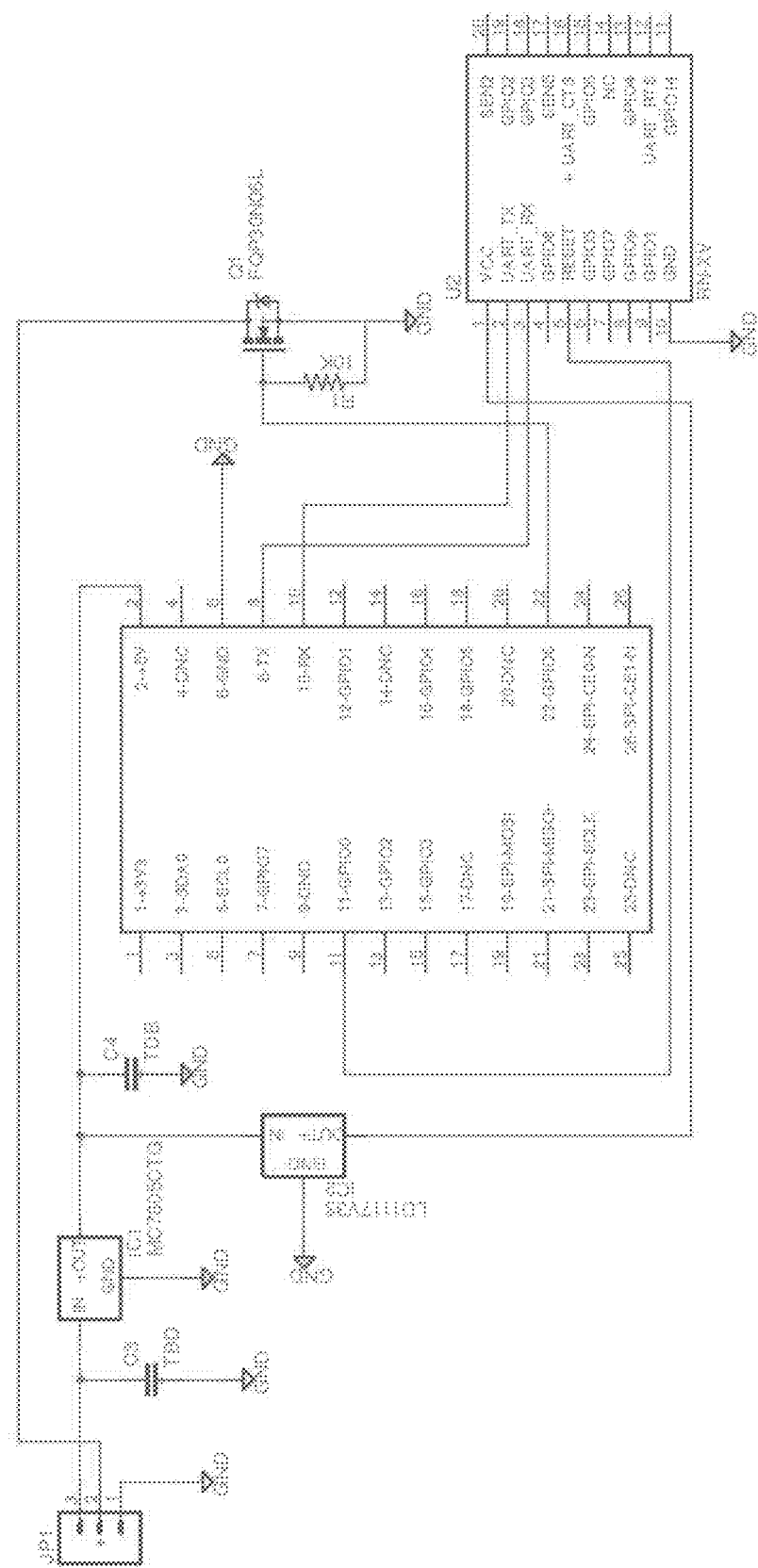
FIG. 10 shows the circuitry components of the video version of a system built in accordance with the present invention.

Referring now to FIGS. 9 and 10, the hardware setup the video version includes also includes a microcontroller 90 which additionally includes an HDMI port 91, with the microcontroller otherwise being configured in a similar manner as in the non-video version with the Wi-Fi 92 module through a universal asynchronous receiver/transmitter, as well as two linear regulators 93 and an NMOS 94.

In the preferred embodiment, the redemption module 52 connects to the validation module 51 server via a web socket. To identify each distinct redemption module 52 which may be in operation at a given time, the validation module utilizes either the microcontroller serial number or the MAC address being used. In addition, for the video version of the redemption module 52, the web socket connection is used to pull any status update currently in use so as to display the status update on the video screen. The video version of the redemption module 52 is also configured to pull the handle/user identification information of a user who successfully redeems a credit so as to display the handle/user identification information on the video screen along with a predefined, credit issuance message. Messages to be displayed on one or more video versions of a redemption module 52 in use at a given time can also be uploaded to the server of the validation module 51 and subsequently pulled by target video version redemption modules 52 so as to be displayed on the video screen.

The dispensing machine interface of the redemption modules 52 built in accordance with the preferred embodiment of the present invention is essentially a tie in to an existing payment system. For example, in standard arcade/carnival games that use a single pulse system, the coin mechanisms have a power, ground and signal connection. When a coin is inserted, it is validated by the mechanism and if valid, the signal line is actuated. This actuation is typically accomplished by pulling the signal line to the ground. This is then repeated with each valid insertion until the preprogrammed number of payments per credit is reached. The dispensing machine interface of the redemption module 52 mimics this by driving the gate of a NMOS that is connected between the signal and the ground inputs. A pulldown resistor between the gate and source with a value of 10K is required to ensure credits are not issued when the redemption module 52's microcontroller GPIO is in an unknown state. It is contemplated that the pulse length for the redemption module 52's microcontroller is customizable and responsive to updates from the server of the validation module 51 to allow flexibility with different dispensing machines 53.

More complex vending machines use serial data to communicate between the main board and the payment devices. To interface with such devices on a microcontroller, the parity bit will need to be manually controlled on each packet of data from the server of the validation module 51.

Figure 11:
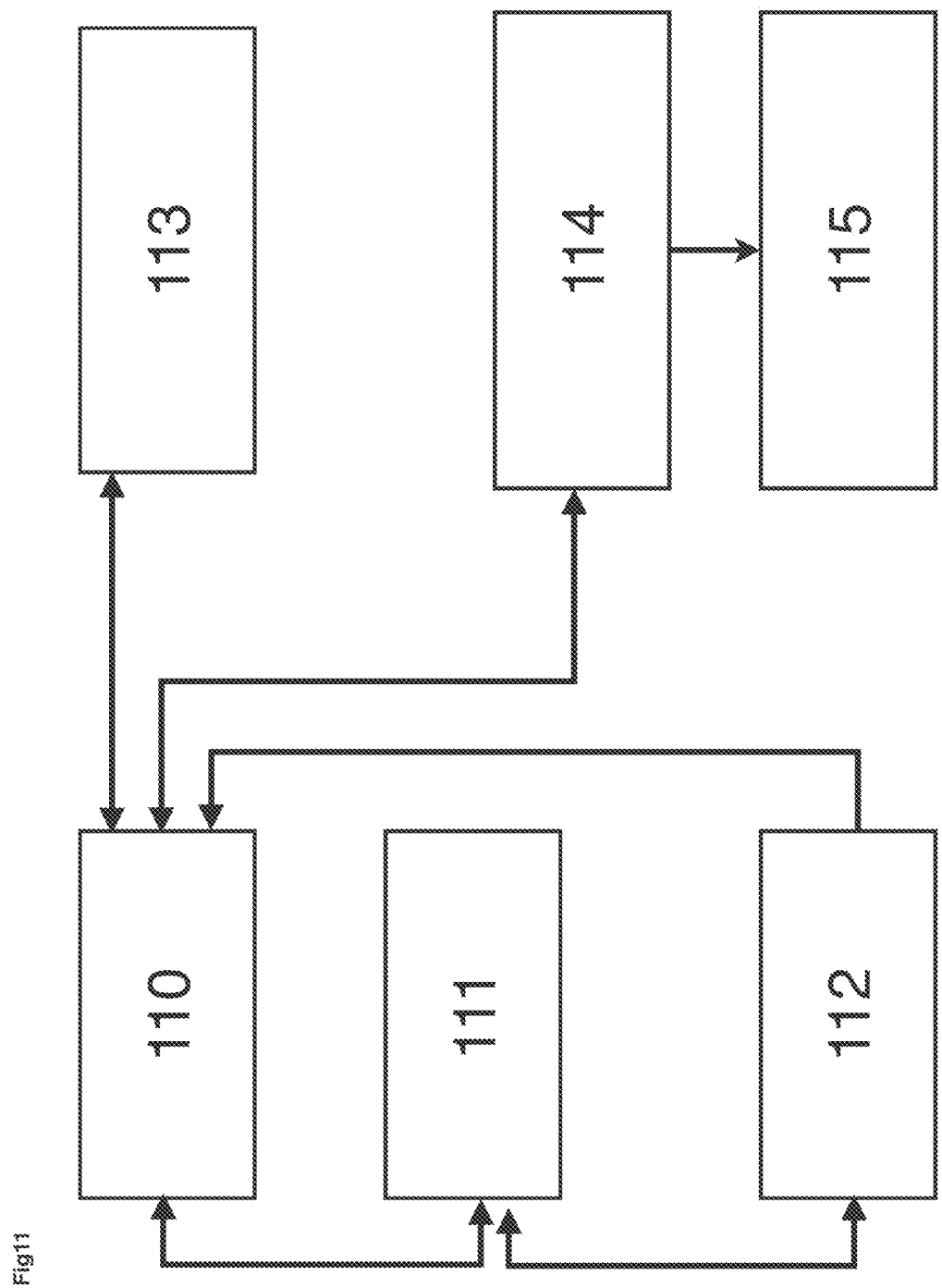
FIG. 11 is a block diagram of the primary software components and their interaction in a system built in accordance with the present invention.
Figure 12:
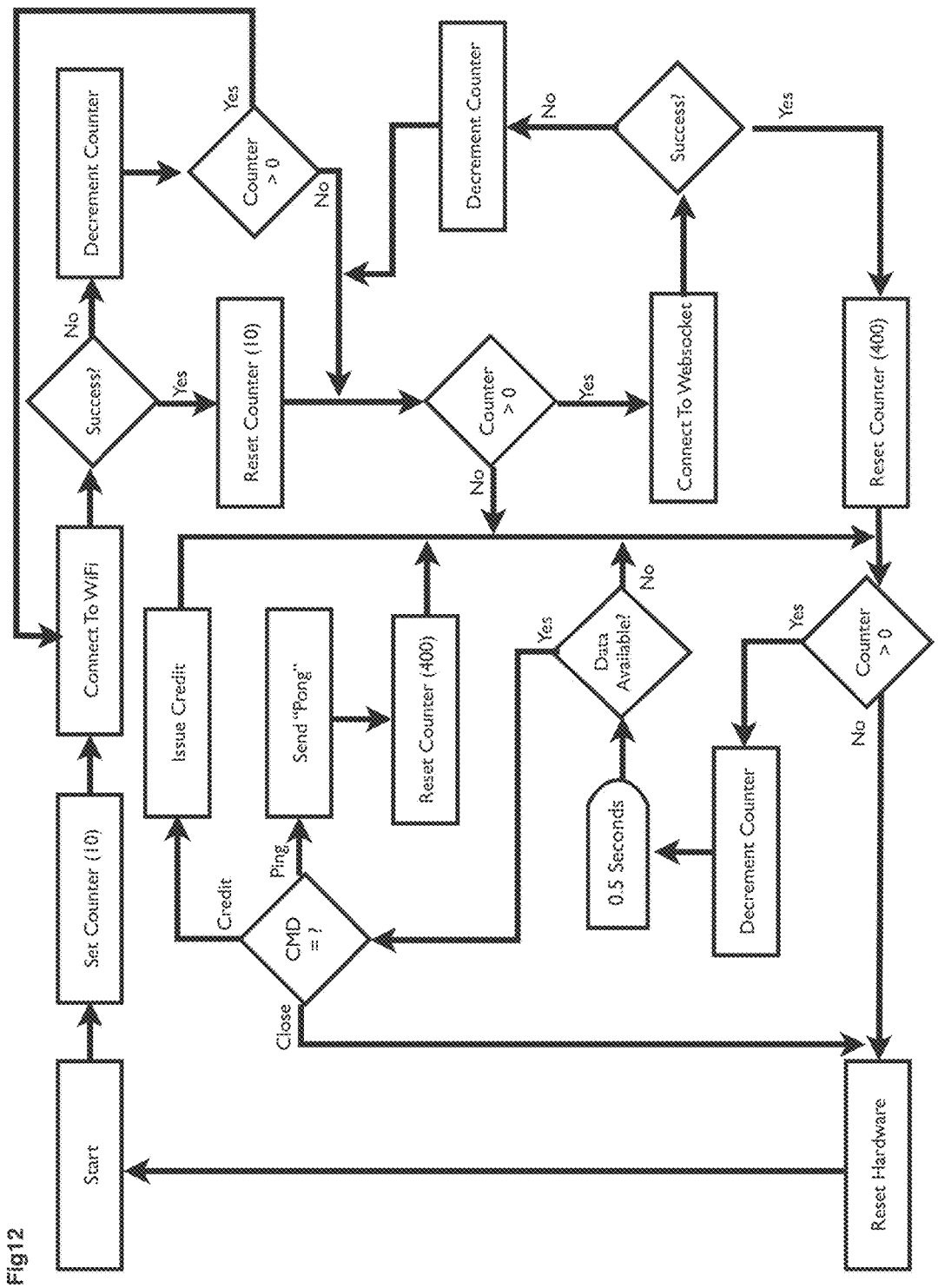
FIG. 12 is a flow chart of the software components are their operation in a system built in accordance with the present invention.

Referring now to FIGS. 11 and 12, the design and operation of the software which operates the rewards distribution system is detailed. In the preferred embodiment, there are three primary software components of the server side of the system, a python portion 110, a MySQL portion 111, and a PHP portion 112. The python portion is the heart of the system, as it handles the majority of the function of the system monitor 50 and validation module 51. It hosts the socket server and the connections to the social media streams 113. It also provides for communications with the redemption module 52 in its interface 114 with a dispensing machine 115. The MySQL portion 111 hosts the database so as to allow logging of all connections, pings, phrase updates, social media publications and credits issued. The PHP portion 112 hosts the administrator interface where machines having a redemption module 52 can be added and controlled.

As seen in FIG. 12, the steps of operation for the software on the redemption module 52 are defined by a use of counters to implement the desired logic It is contemplated that future expansion can be accounted for by an expansion header which all available I/O connections are brought to. In the preferred embodiment, a 26 pin header is used to allow for the same.

| | |
|---|---|
| Vin | P20/Analog In |
| GND | P19/Analog In |
| 5 V | P18/Analog In/Analog Out |
| GND | P17/Analog In |
| 3.3 V | P16/Analog In |
| GND | P15/Analog In |
| P14/RX | P27/RX/SCI |
| P13/TX | P28/TX/SDA |
| P5/MOSI | P29 |
| P6/MISO | P30 |
| P7/SCK | P26/PWM |
| P22/PWM | P25/PWM |
| P23/PWM | P24/PWM |

In an alternate embodiment, software for the rewards distribution system is embedded in one or more applications which allow access to a user's social media network accounts such that the user's activity on the affected social media network account is purposefully and directly availed to the system monitor for scanning.

The instant invention has been shown and described herein in what is considered to be the most practical and preferred embodiments. It is recognized, however, that variations and departures may be made therefrom within the scope of the inventions and that obvious modifications will occur to a person of ordinary skill in the art.

What is claimed is:

1. A method of rewarding electronic communications activity by issuing credit on a vending or gaming machine in response to a published message, comprising the steps of:

providing a vending or gaming machine having a payment system that is operative to accept a payment and issue a machine credit which can be redeemed on the vending or gaming machine in response to the accepted payment;

coupling the payment system of the vending or gaming machine with a rewards distribution system in a manner which adapts the payment system of the vending or gaming machine to additionally issue machine credit which can be redeemed on the vending or gaming machine in response to a signal from the rewards distribution system by mimicking with the signal a mechanism through which the payment system issues machine credit in response to accepted payment;

posting a match phrase defining a predetermined character string at the location of the vending or gaming machine;

monitoring by the rewards distribution system at least one social media network for a qualifying social action, wherein the qualifying social action is defined by a publication to a social media user account from a discrete mobile device that includes said match phrase; and following the qualifying social action being detected by the rewards distribution system on the at least one social media network, causing by the payment system of the rewards distribution system the vending or gaming machine to issue the machine credit.

2. The method of claim 1, additionally comprising the step of validating by the rewards distribution system the upon the qualifying social action being detected by the rewards distribution system on the at least one social media network, wherein the step of validating is a prerequisite to the step of causing and includes ascertaining the location of the discrete mobile device at the time the qualifying social action is published.

3. The method of claim 1, additionally comprising the step of validating by the rewards distribution system the upon the qualifying social action being detected by the rewards distribution system on the at least one social media network, wherein the step of validating is a prerequisite to the step of causing and includes determining whether the user account had published the qualifying social action to cause the issue of machine credit on a previous occasion.

4. The method of claim 1, additionally comprising the step of validating by the rewards distribution system the upon the qualifying social action being detected by the rewards distribution system on the at least one social media network, wherein the step of validating is a prerequisite to the step of causing and includes ascertaining the location of the discrete mobile device at the time the qualifying social action is published and determining whether the user account had published the qualifying social action to cause the issue of machine credit on a previous occasion.

5. The method of claim 1, wherein the step of monitoring includes repeatedly checking for the use of a metadata tag that includes said match phrase on the at least one social media network.

6. A method of rewarding electronic communications activity by issuing credit on a vending or gaming machine in response to a published message, comprising the steps of:

providing a vending or gaming machine having a payment system that is operative to accept a payment and issue a machine credit which can be redeemed on the vending or gaming machine in response to the accepted payment;

coupling the payment system of the vending or gaming machine with a rewards distribution system in a manner which adapts the payment system of the vending or gaming machine to additionally issue machine credit which can be redeemed on the vending or gaming machine in response to a signal from the rewards distribution system by mimicking with the signal a mechanism through which the payment system issues machine credit in response to accepted payment;

posting a match phrase defining a predetermined character string at the location of the vending or gaming machine;

providing by the rewards distribution system a social update portal defining a software implemented interface accessible on a discrete mobile communications through which a qualifying social action is performed, wherein the qualifying social action is defined by a publication to a social media user account from the discrete mobile device that includes said match phrase; and following a performance of the qualifying social action through the social update portal, causing by the rewards distribution system the payment system of the vending or gaming machine to issue the machine credit.

7. The method of claim 6, additionally comprising the step of validating by the rewards distribution system the upon the qualifying social action being performed through the social update portal, wherein the step of validating is a prerequisite to the step of causing and includes ascertaining the location of the discrete mobile device at the time the qualifying social action is published.

8. The method of claim 6, additionally comprising the step of validating by the rewards distribution system the upon the qualifying social action being performed through the social update portal, wherein the step of validating is a prerequisite to the step of causing and includes determining whether the user account had published the qualifying social action to cause the issue of machine credit on the vending or gaming machine on a previous occasion.

9. The method of claim 6, additionally comprising the step of validating by the rewards distribution system the upon the qualifying social action being performed through the social update portal, wherein the step of validating is a prerequisite to the step of causing and includes ascertaining the location of the discrete mobile device at the time the qualifying social action is published and determining whether the user account had published the qualifying social action to cause the issue of machine credit on the vending or gaming machine on a previous occasion.

10. The method of claim 6, wherein the social update portal is operative to send an electronic notification from the discrete mobile device to the rewards distribution system upon the performance of the qualifying social action through the social update portal.

11. A method of rewarding electronic communications activity by issuing credit on a turnstile or ticket dispensing machine in response to a published message, comprising the steps of:

providing a turnstile or ticket dispensing machine having a payment system that is operative to accept a payment and issue a machine credit which can be redeemed on the turnstile or ticket dispensing machine in response to the accepted payment;

coupling the payment system of the turnstile or ticket dispensing machine with a rewards distribution system in a manner which adapts the payment system of the turnstile or ticket dispensing machine to additionally issue machine credit which can be redeemed on the turnstile or ticket dispensing machine in response to a signal from the rewards distribution system by mimicking the manner in which the payment system issues machine credit in response to accepted payment by mimicking with the signal a mechanism through which the payment system issues machine credit in response to accepted payment;

posting a match phrase defining a predetermined character string at the location of the turnstile or ticket dispensing machine;

providing by the rewards distribution system a social update portal defining a software implemented interface accessible on a discrete mobile communications through which a qualifying social action is performed, wherein the qualifying social action is defined by a publication to a social media user account from the discrete mobile device that includes said match phrase; and following a performance of the qualifying social action through the social update portal, causing by the rewards distribution system the payment system of the turnstile or ticket dispensing machine to issue the machine credit.

12. The method of claim 11, additionally comprising the step of validating by the rewards distribution system the upon the qualifying social action being performed through the social update portal, wherein the step of validating is a prerequisite to the step of causing and includes ascertaining the location of the discrete mobile device at the time the qualifying social action is published.

13. The method of claim 11, additionally comprising the step of validating by the rewards distribution system the upon the qualifying social action being performed through the social update portal, wherein the step of validating is a prerequisite to the step of causing and includes determining whether the user account had published the qualifying social action to cause the issue of machine credit on the vending or gaming machine on a previous occasion.

14. The method of claim 11, additionally comprising the step of validating by the rewards distribution system the upon the qualifying social action being performed through the social update portal, wherein the step of validating is a prerequisite to the step of causing and includes ascertaining the location of the discrete mobile device at the time the qualifying social action is published and determining whether the user account had published the qualifying social action to cause the issue of machine credit on the turnstile or ticket dispensing machine on a previous occasion.

15. The method of claim 11, wherein the social update portal is operative to send an electronic notification from the discrete mobile device to the rewards distribution system upon the performance of the qualifying social action through the social update portal.

* * * * *